Feb. 12, 1935. C. Z. CASE ET AL 1,991,137
CONVEYER, PARTICULARLY FOR USE IN CONTINUOUS FILM PROCESSING MACHINES
Filed Oct. 25, 1932 3 Sheets-Sheet 2
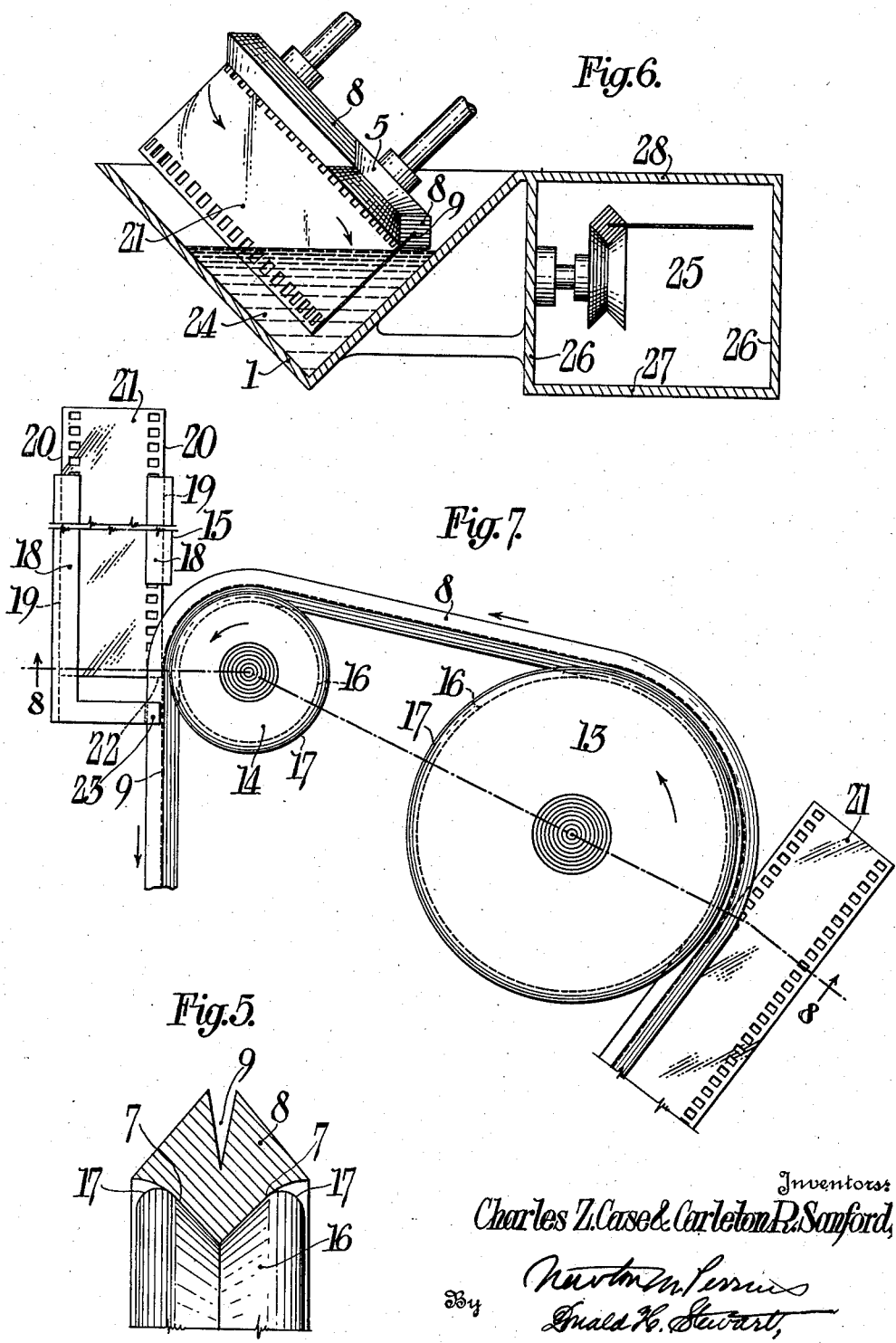

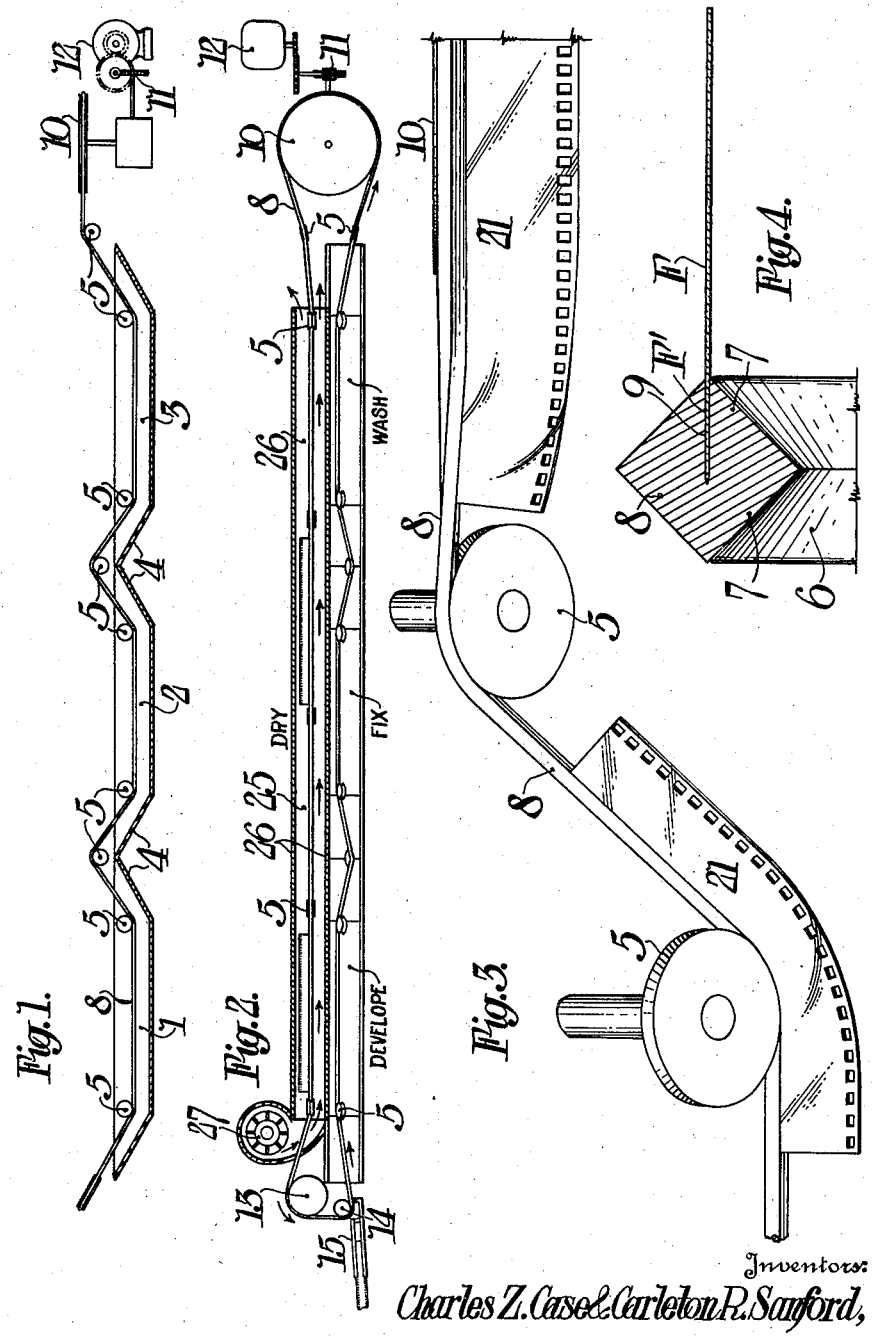

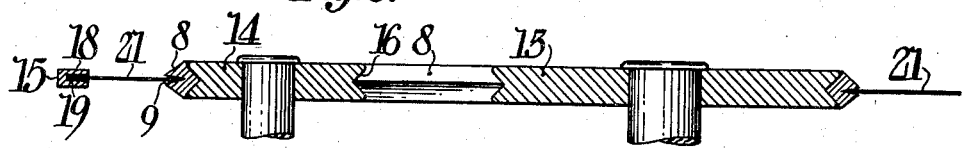
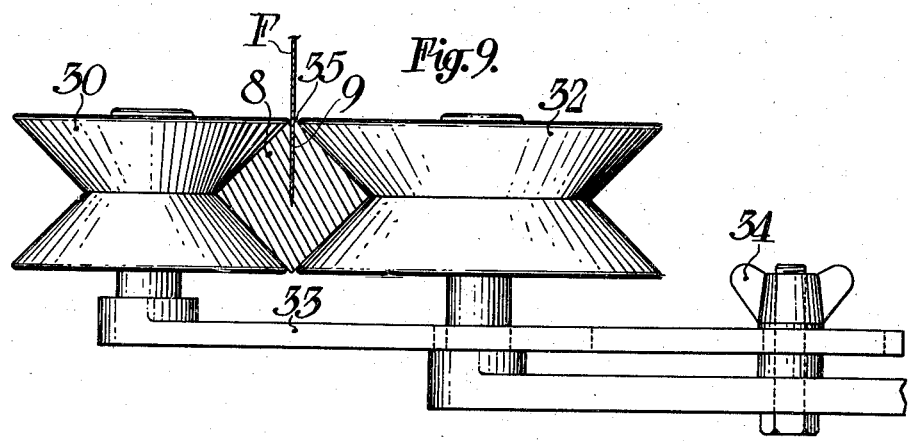
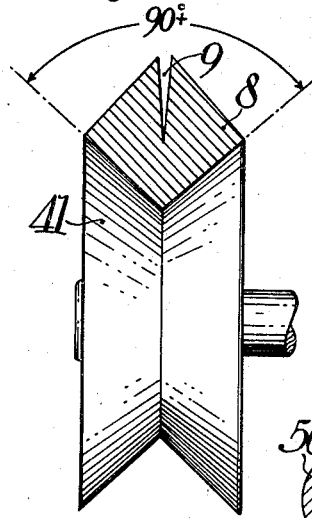
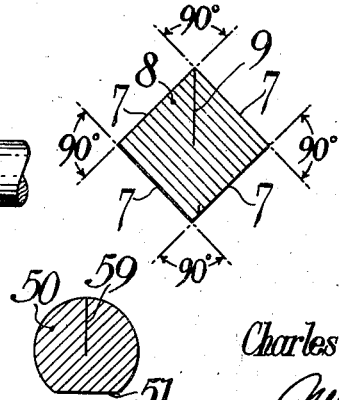
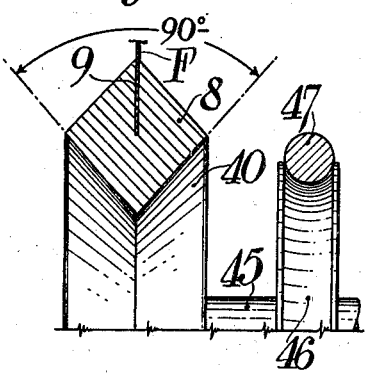

Patented Feb. 12, 1935

1,991,137

UNITED STATES PATENT OFFICE 1,991,137

CONVEYER, PARTICULARLY FOR USE IN CONTINUOUS FILM PROCESSING MACHINES

Charles Z. Case and Carleton R. Sanford, Rochester, N. Y., assignors to Eastman Kodak Company, Rochester, N. Y., a corporation of New York Application October 25, 1932, Serial No. 639,522

16 Claims. (Cl. 271—75)

This invention relates to conveyers and particularly to conveyers for use in continuous film processing machines. One object of our invention is to provide a conveyer belt which can be made of any desired length to conduct sheet material through a plurality of processing stations. Another object of our invention is to provide a simple type of conveyer which will securely hold individual sheets and strips of material to be processed. Another object of our invention is to provide a conveyer belt which is polygonal in cross section and which is provided with a slit normally pressed closed by the tension on the belt but capable of being opened for the insertion and removal of sheet material. Another object of our invention is to provide a conveyer belt with a slit which will remain closed as long as the conveyer belt holds its normal cross section and to provide a conveyer belt in which the slit will be opened by distorting the belt from its normal cross section. Still another object of our invention is to provide a conveyer belt which can be bent back and forth by passing the belt over a plurality of guide pulleys and which will retain sheet material while passing over the guide pulleys. Still another object of our invention is to provide a conveyer which will securely grasp sheet material by an edge thereof and convey the sheets through the necessary fluid processing baths and through a drier finally releasing the sheets after they are processed and other objects will appear from the following specification, the novel features being particularly pointed out in the claims at the end thereof.

Since our conveyer belt is particularly for use in developing photographic material such as film, paper and the like its application to a film processing machine is described as a preferred embodiment of our invention although obviously our conveyer can be used for many different purposes.

Coming now to the drawings wherein like reference characters denote like parts throughout;

Fig. 1 is a side elevation partially in section of a film processing machine employing our conveyer constructed in accordance with one embodying a preferred form of our invention;

Fig. 2 is a plan view of the machine shown in Fig. 1 with a part in section;

Fig. 3 is an enlarged detailed view showing a portion of the conveyer belt and guiding pulleys in elevation;

Fig. 4 is an enlarged detailed section showing a portion of the conveyer holding a piece of sheet material as it passes over a guiding pulley;

Fig. 5 is an enlarged detailed section of the conveyer belt being distorted to open the sheet holding slot for releasing or receiving a piece of sheet material;

Fig. 6 is a fragmentary detailed sectional view showing a film entering a treatment tank;

Fig. 7 is an enlarged plan view of the loading and discharging end of the conveyer shown in Fig. 2;

Fig. 8 is a sectional view on line 8—8 of Fig. 7.

Fig. 9 is a plan view partially in section showing a modified form of conveyer guide;

Fig. 10 is a sectional view of a preferred form of conveyer;

Fig. 11 is a side elevation partially in section of a modified form of conveyer guide adapted to distort the conveyer to open the sheet holding slit;

Fig. 12 is a plan view partially in section of a modified form of guide showing a roller which tends to close the sheet holding slit; and Fig. 13 is a modified shape of belt in section.

Broadly speaking our invention consists in providing a polygonal resilient belt with a slit which slit is normally retained closed through the resiliency of the conveyer and the pull on the belt but which slit may be opened by distorting the normal cross section of the belt in such a manner that a sheet can be introduced or removed from the conveyer.

As a preferred form of our invention we show in Figs. 1 and 2 a film processing machine which both treats the film with the necessary fluid treatment baths and dries the film.

Referring to these figures as indicated in Fig. 1 the fluid treatment tanks 1, 2 and 3 may be arranged in a line, these tanks all being connected by means of sloping walls 4. Above and in these tanks are supported a plurality of belt guiding rollers 5. These rollers may be carried by suitable supports and as best shown in Fig. 4 are provided with a grooved periphery 6 of a shape to substantially fit two of the sides 7 of the polygonal conveyer belt 8.

The conveyer belt 8 is preferably made of resilient material such as rubber although it is sometimes convenient to provide in addition to the rubber some material such as fabric reinforcement which prevents the belt from stretching unduly. It is, however, desirable to have the belt somewhat resilient. The conveyer belt 8 is provided with a slit 9 which is merely a cut which extends into the interior of the belt for a short distance. This cut is preferably made in the corner of the belt or in a place where two of the polygonal sides join although this is not absolutely necessary and depends somewhat on the cross section of the belt.

As indicated in Fig. 4 a sheet of material such as a film F may be securely held in the slit 9 by means of the natural resiliency of the belt 8 when the belt is retained with its normal cross section as indicated in Fig. 4. The end F' of the film is here shown as extending into the slit 9 and being firmly secured in this position.

The belt 8 as indicated in Fig. 1 and Fig. 2 may be an endless belt and may derive power from a wheel 10 which is driven through a series of gears 11 from a motor 12.

For a short machine only one of such drives is necessary. We find, however, that in a large machine it is preferable to drive the belt from a series of stations since this reduces the tendency which might otherwise exist of putting too great a strain on portions of the belt to properly handle the film.

In Figs. 1 and 2 the belt passes over a large idle pulley 13 and a small pulley 14 which is at the loading station 15.

Referring particularly to Figs. 7 and 8 wherein the loading and discharging station is shown and as clearly shown in Fig. 7, the pulleys 13 and 14 are designed to distort the normal cross section of the belt 8 in such a manner that the slit 9 will be spread open as indicated in Fig. 5.

In this form of our invention the belt may be distorted by providing the pulleys 13 and 14 with a groove 16 which has rounded shoulders 17 since these shoulders do not conform in shape to the sides 7 of the belt and since the belt is pulled in the direction shown by the arrows in Figs. 2 and 7 the belt is distorted during that part of its movement in which it is in contact with the distorting pulleys 13 and 14.

Thus the slit 9 is open as indicated at Fig. 5 at the loading station 15. This station may consist of a pair of guide rails 18 which are grooved at 19 to receive the edges 20 of a length of film 21, here shown as motion picture film. This film is slid down the guide rails 19 until an edge 22 enters the opened slit 9. As soon as the belt moves away from the pulley 14 this slit closes as the belt assumes its normal cross section and firmly grasps the edge of the film withdrawing it from the loading station. If necessary to assist the belt in assuming its normal cross section a fixed guide 23 may be employed, this guide being Y-shaped and tending to close the sides of the slits 9 together. We have not found, however, that such a guide is usually necessary.

From the loading station 15 the film passes downwardly over the guide roller 5 into tank 1 which contains a developing bath.

Referring to Fig. 6 it will be seen, if the film moves in the direction shown by the arrow, it is entered, corner first, into the developing bath 24 which is contained in the tank 1. This is very desirable because by entering film in this manner air bells which frequently form on a film being entered into fluid treatment baths are prevented.

In Fig. 6 the belt 8 is shown as being approximately at the level of the developing bath 24. It is immaterial whether the belt actually goes into the bath or over the bath so long as all of the film which must be developed is passed through the bath.

As the belt continues to move the film is conducted through the succeeding tanks 2 and 3 which may, as indicated in Fig. 2, contain a fixing bath and a washing bath. It is, of course, to be understood that the length of these tanks is not in proportion in scale to the rest of the drawings as it is usually necessary to make the tanks for some baths longer than others in order to properly fluid treat the film.

After passing through the succession of baths the film as indicated in Fig. 3 is carried up over the guide roller 5 and is twisted as it passes about the pulley 10. It should be noted that a conveyer belt constructed in accordance with our invention can be bent or distorted at will in order to move the belt through the desired path and that the slit 9 will remain closed as long as the cross section of the belt remains normal. However, when the belt is distorted from the normal particularly by bending sharply and stretching the belt opposite the slit 9, this slit will open.

The films are conducted about the driving pulley 10 and over a series of other guide rollers 5 which conduct the films through a drying chamber 25. This drying chamber may merely consist of a tunnel as best indicated in Fig. 6 having side walls 26, a bottom wall 27 and a top wall 28. We find it convenient to blow air through the drying tunnel 25 by means of any standard type blower diagrammatically illustrated in Fig. 2 at 27. After the films have passed through the drying tunnel they reach the pulley 13 which distorts the conveyer 8 from its usual cross section and permits the films 21 to drop from the conveyer a short distance from the loading station 15.

We have found it possible with a machine of this type to develop short lengths of film and to dry the film in thirty minutes although, of course, this time varies with the strength of the developer and the amount of washing which is given to the film.

It is sometimes necessary to support the conveyer belt from both sides at the same time and such a support can be readily made to hold the belt in its normal cross section with the slit closed. Such a support is shown in Fig. 9 wherein the belt 8 passes between a pair of belt guiding pulleys 30 and 32, the former being preferably carried by a slidable bracket 33 adjustable by a set screw 34 to vary the separation of the pulleys for initially positioning the conveyer. When such pulleys are used it should be noted that there is a space 35 left between the peripheries of the two pulleys so that a film F may project between the pulleys without touching either one of them. Any number of these conveyer pulleys can be used.

As a modified form of our invention a different system of conveyer guide pulleys may be used as indicated in Figs. 10, 11 and 12.

If the conveyer belt 8 is square and we prefer this shape, the corners of the four sides 7 are 90°. We have found that if this belt passes over a pulley as shown in Fig. 4, the groove of which is 90°, the slit 9 will remain closed. However, from long continued use the slit 9 might tend to open and to prevent this the pulley shown in Fig. 12 may be used. In this case the pulley 40 is provided with a V-shaped groove which is less than 90°. This tends to push the sides of the slit 9 together and to grasp the film F more firmly than ever.

It is also quite practicable to provide a pulley 41 with a V-shaped groove of more than 90° so that when a belt 8 is drawn tightly about this pulley the slit 9 tends to open up for receiving or for dropping the sheet material which it is adapted to carry.

In long machines difficulties due to uneven tension on the belt may be overcome as indicated in Fig. 12 by using belt 8 solely as a conveyer belt and employing a separate driving belt 47 which may turn pulley 46 and shaft 45 on which the belt guiding pulley 40 (or a guide pulley 5) is mounted. Such an arrangement by driving the conveyer belt 8 at some or all of its contacts with supporting wheels entirely relieves the conveyer 8 of uneven tension. In addition the driving belt 47 can be kept out of the treatment solutions so that even traction on all pulleys will result.

We have found it possible to use a round belt but on account of the difficulty of keeping the slit in the proper location it is found preferable to use a belt 50 slit at 59 having one or more flat sides 51 as indicated in Fig. 13 so that the belt could be more readily guided. Since we were able to buy a square belt on the open market and since such a belt is entirely satisfactory in use it is shown as our preferred form of conveyer although any belt which is resilient and which can be guided over the necessary conveyer guide pulleys can be used without departing from our invention.

What we claim is:

1. In a conveyer for sheet material the combination with a slitted resilient belt of uniform cross section, said slit extending longitudinally of said belt throughout the length thereof, of a guide for said belt for maintaining the uniform cross section while guiding said belt through a path, and a second belt guide shaped to distort said belt from its normal cross section whereby the slit in the belt may open up.

2. In a conveyer for sheet material the combination with a slitted resilient belt of uniform cross section, said slit extending longitudinally of the belt and including a flat adapted to guide said belt, of a guide roller for said belt adapted to maintain the uniform cross section of the belt and contact with the flat on the belt, a second guide roller shaped to distort said belt whereby said slit may open up.

3. In a conveyer for sheet material the combination with a slitted resilient belt of uniform cross section, said slit extending longitudinally of the belt and including a flat adapted to guide said belt, a guiding surface on said belt, said slit in said belt lying opposite to said guiding surface, a guide roller adapted to guide the belt and maintain its uniform cross section through contact with the guiding surface, a second film guide adapted to flex the belt about its guiding surface, thus distorting the belt from its normal cross section and opening the slit.

4. A conveyer for strips of material including, in combination, a polygonal belt, having a slit extending longitudinally thereof, a plurality of guide rollers for supporting said belt, said guide rollers having a belt engaging surface complementary in shape to at least two of the polygonal sides of the belt, whereby the normal shape of the belt is maintained.

5. A conveyer for strips of material including, in combination, a polygonal belt, including a slit extending longitudinally thereof, a plurality of guide rollers for supporting said belt, said guide rollers having a belt engaging surface complementary in shape to at least two of the polygonal sides of the belt, whereby the normal shape of the belt is maintained and another guide roller having a non-complementary belt engaging surface adapted to distort said belt from its normal shape.

6. A conveyer for sheet material including, in combination, a belt including a slit extending longitudinally thereof and having at least one flat side, said slit lying in a predetermined position with reference to said flat side, means for guiding said belt through a fixed path, said means maintaining the normal cross section of the belt and retaining said slit in a closed position and a film guide of different shape from the shape of the belt and adapted to distort the belt from its normal cross section by binding about said flat side whereby the slit may be caused to open.

7. In a conveyer for sheet material the combination with means for moving sheets including a resilient longitudinally slitted belt, of a guide means shaped to bend said belt from a side opposite to said slit to open said slit for the introduction of sheets, power operated means for moving said belt from said guide means to close said slit and move said introduced sheet material and a plurality of belt guides shaped to guide said belt through a path with the slit closed.

8. A conveyer for sheet material comprising a resilient belt having at least one flat side, said belt including a slit extending from the exterior of the belt into the interior but not through the belt, the slit in the exterior wall of said belt being substantially parallel to said flat side.

9. A conveyer for sheet material comprising an endless belt of resilient material slitted throughout its length.

10. A conveyer for sheet material comprising an endless belt of resilient material slitted throughout its length, said slit extending from an exterior wall of said belt into the interior thereof.

11. A conveyer for sheet material comprising a resilient belt polygonal in cross section and including a slit extending longitudinally of said belt, said slit being positioned between two of the polygonal sides of the belt and extending from an exterior wall of the belt into the interior of the belt section but not extending through the belt.

12. A conveyer for sheet material comprising a resilient belt polygonal in cross section and including a slit extending longitudinally of said belt, said slit being positioned along an edge of the belt between two of the polygonal sides thereof and extending from the exterior of the belt into the interior but not through the belt.

13. A conveyer for sheet material comprising a resilient belt of a definite and uniform cross section, said belt being slitted longitudinally of the belt, said slit extending from the exterior of the belt into the interior but not through the belt whereby two additional walls are formed normally terminating in the interior of the belt.

14. In a conveyer for sheet material, the combination with a means for moving sheets including a slitted belt of a predetermined cross section, said slit extending into but not through said belt and being substantially parallel to said belt, of means for introducing sheet material into the slit in the belt comprising a belt guide adapted to engage said belt and distort it from its predetermined cross section to open the slit.

15. In a conveyer for sheet material, the combination with a means for moving sheets including a slitted belt of a predetermined cross section, said slit extending longitudinally thereof, of means for introducing sheet material into the slit in the belt comprising a belt guide adapted to engage said belt and distort it from its predetermined cross section to open the slit, and other belt guides of a shape complementary to the belt whereby said belt may be guided through a path with said slit closed.

16. In a conveyer for sheet material, the combination with means for moving sheets including a resilient belt, a slit extending into but not through said belt and extending longitudinally thereof, of means for bending said belt from a side opposite to said slit to open said slit for the introduction of sheets, power operated means for moving said belt from said guide to close said slit and move said introduced sheet material.

CHARLES Z. CASE.
CARLETON R. SANFORD.